United States Patent
Rector et al.

(10) Patent No.: US 7,770,170 B2
(45) Date of Patent: Aug. 3, 2010

(54) BLOCKING LOCAL SENSE SYNCHRONIZATION BARRIER

(75) Inventors: John Rector, Redmond, WA (US); Jonathan D. Morrison, North Bend, WA (US); Neill M. Clift, Kirkland, WA (US); Arun U. Kishan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1075 days.

(21) Appl. No.: 11/180,338

(22) Filed: Jul. 12, 2005

(65) Prior Publication Data

US 2007/0016905 A1  Jan. 18, 2007

(51) Int. Cl.
*G06F 9/46* (2006.01)
*G06F 9/45* (2006.01)
*G06F 13/00* (2006.01)
*G06F 17/30* (2006.01)

(52) U.S. Cl. .................. 718/102; 718/104; 707/999.08; 710/200; 717/100; 717/158; 711/145; 711/149

(58) Field of Classification Search ......... 718/100–108; 717/100, 158; 710/200; 707/999.08; 711/145, 711/149
See application file for complete search history.

(56) References Cited

U.S. PATENT DOCUMENTS

| | | | |
|---|---|---|---|
| 5,434,995 A | 7/1995 | Oberlin et al. | 395/550 |
| 5,442,758 A * | 8/1995 | Slingwine et al. | 1/1 |
| 5,787,272 A | 7/1998 | Gupta et al. | 395/553 |
| 6,112,222 A | 8/2000 | Govindaraju et al. | 709/102 |
| 6,117,181 A | 9/2000 | Dearth et al. | 703/22 |
| 6,216,174 B1 | 4/2001 | Scott et al. | 709/400 |
| 6,223,335 B1 * | 4/2001 | Cartwright et al. | 717/100 |
| 6,263,406 B1 | 7/2001 | Uwano et al. | 711/141 |
| 6,345,242 B1 | 2/2002 | Dearth et al. | 703/22 |
| 6,549,881 B1 | 4/2003 | Dearth et al. | 703/21 |
| 6,718,484 B1 | 4/2004 | Kodera | 714/35 |
| 6,785,888 B1 | 8/2004 | McKenney et al. | 718/104 |
| 6,854,108 B1 | 2/2005 | Choi | 717/125 |

(Continued)

FOREIGN PATENT DOCUMENTS

WO    WO 99/26148    *    8/1999

OTHER PUBLICATIONS

Zhang et al., "Busy-Wait Barrier Synchronization Using Distributed Counters With Local Sensor", Springer-Verlag, 2003, pp. 84-98.*

(Continued)

*Primary Examiner*—Meng-Ai An
*Assistant Examiner*—Jennifer N To
(74) *Attorney, Agent, or Firm*—Woodcock Washburn LLP

(57) ABSTRACT

A blocking local sense synchronization barrier is provided. The local sense variable is not processor private or global, but truly local to the synchronization barrier function. Safe deletion is provided by making sure the last operation a thread performs on a barrier is a write. Just before returning, threads increment a field that indicates the count of threads that have left the barrier. Blocking is supported such that threads spin for some interval, and when they decide to block, examine and set (if not already set) the indication of whether a thread is blocking that is to be examined by the last thread to arrive at the barrier to determine whether to set an event to release blocking threads.

18 Claims, 7 Drawing Sheets

U.S. PATENT DOCUMENTS

| | | | |
|---|---|---|---|
| 7,058,945 B2* | 6/2006 | Ichinose et al. | 718/102 |
| 7,228,545 B2* | 6/2007 | Circenis et al. | 718/102 |
| 7,376,744 B2* | 5/2008 | Loaiza et al. | 709/229 |
| 7,487,501 B2* | 2/2009 | Silvera et al. | 718/100 |
| 7,512,950 B1* | 3/2009 | Marejka | 718/106 |
| 7,571,439 B1* | 8/2009 | Rabinovici et al. | 718/104 |
| 2004/0093477 A1 | 5/2004 | Oberdorfer | 712/13 |
| 2004/0139439 A1 | 7/2004 | Machida et al. | 718/105 |
| 2004/0187118 A1* | 9/2004 | Blainey et al. | 718/100 |
| 2004/0215898 A1 | 10/2004 | Arimilli et al. | 711/144 |
| 2005/0050374 A1 | 3/2005 | Nakamura et al. | 713/375 |

OTHER PUBLICATIONS

Domani et al., "Thread-Local Heaps for Java", ACM, 2002, pp. 76-87.*

Ball et al., "Barrier Synchronization in Java", UKHEC Technical Report, 2003, pp. 1-30.*

Anderson, T.E., "The performance of spin lock alternatives for shared-memory multiprocessors," *IEEE Transactions on Parallel and Distributed Systems*, 1990, 1(1).

Ball, C., et al., "Barrier Synchronisation in Java," ukhec.ac.uk/publications/reports/synch_java.pdf, downloaded Aug. 23, 2005, 25 pages.

Cohen, W.E., et al., Dynamic Barrier Architecture for Multi-Mode Fine-Mode Fine-Grain Parallelism using Conventional Processors: Part I: Barrier Architecture, aggregate.org/TechPub/TREE94_9/tree94_9.html, downloaded Aug. 23, 2005, 18 pages.

Han, H., et al., "Eliminating Barrier Synchronization for Compiler-Parallelized Codes on Software DSMs," arcs.kaist.ac.kr/papers/ijpp98.pdf, downloaded Aug. 23, 2005, 19 pages.

Herlihy, M., et al., "Introduction to Multiprocessors: algorithms, data structures, and programming," cs.brown.edu/courses/cs176/barrier.pdf, Nov. 17, 2003, *Chapter 11*, 203-212 and 249-252.

Kontothanassis, L., et al., "Using scheduler information to achieve optimal barrier synchronization performance," *ACM SIGPLAN Notices, Proceedings of the 4th ACM SIGPLAN Symposium on Principles and Practice of parallel programming*, delivery.acm.org/10.1145/160000/155339/p64-kontothanassis.pdf?key1=155339&&key2=5273305901&coll=ACM&dl=ACM&CFID=27301003&CFTOKEN=7, 1993, 28(7), 4 pages.

Mellor-Crummey, J., et al., "Algorithms for scalable synchronization on shared-memory multiprocessors," *ACM Transactions on Computer Systems (TOCS)*, portal.acm.org/citation.cfm?id=103729&coll=ACM&dl=ACM&CFID=27301003&CFTOKEN=77797719, 1991, 14 pages.

Rosenthal, D., et al., Using hard disks for digital preservation, citeseer.ist.psu.edu/update/440463, downloaded Aug. 23, 2005, 3 pages.

Tsafrir, D., et al., "Barrier synchronization on a loaded SMP using two-phase waiting algorithms," *International Parallel & Distributed Proceedings Symposium*, citeseer.ist.psu.edu/cache/papers/cs/25763/http:zSzzSzwww.cs.huji.ac.ilzSz-feitzSzpaperszSzbarrier.pdf/tsafrir02barrier.pdf, 2002.

* cited by examiner

BLOCKING LOCAL SENSE SYNCHRONIZATION BARRIER

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2005, Microsoft Corp.

BACKGROUND

Synchronization barriers (barriers) are a primitive used in parallel computing which allow the programmer to guarantee that all threads have finished one phase of their work before allowing any thread to begin the next phase. The synchronization barrier implements a function with the property that no thread will return from the call before all threads have entered it. To illustrate, consider an example where the programmers has several threads running the same code, all processing Work1( ), and does not want any thread to begin Work2( ) until all threads have finished Work1( ). With a barrier, the code would look like this:

Work1( );
Barrier( );
Work2( );

Here, as threads arrive at the Barrier( ) call, they pause (either spinning or blocking) until all threads have arrived, at which point all threads are released to being Work2( ). Note that synchronization barriers should be able to be reused: it must be possible for each thread to call Barrier( ) again on the same structure after completing Work2( ).

These primitives are frequently used in scientific and mathematic computing and other highly parallel workloads. In systems where there are not synchronization barrier primitives, developers who require this functionality are forced to implement their own barriers. This leads to duplicated work and sometimes incorrect code. Further, this is an area where value can be added by building a synchronization barrier which is not only fast, but better supports real-world usage by efficiently handling the deletion of the barrier.

In this regard, there is a need for a fast and robust primitive to replace the existing barriers with a faster implementation and to support the requirements of a high-performance synchronization barrier with support for blocking and deletion.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, a blocking local sense synchronization barrier is provided. For several embodiments, synchronizing software threads via a synchronization barrier implemented via a synchronization barrier method is carried out in part by using a variable local to the synchronization barrier method that is to be changed within the synchronization barrier method and examined to determine when software threads should be released. Also, safe deletion of a barrier is provided by ensuring the last operation a thread performs while in the synchronization barrier method is a write to ensure safe deletion of the barrier. This is done by maintaining a count of variables which have left the synchronization barrier.

Blocking by threads is supported by using an indication to determine whether a thread is blocking, resetting a previous event by a last thread to arrive at the barrier, determining whether to set a current event by the last thread to arrive at the barrier by examining the indication, releasing spinning threads waiting for the last thread to arrive at the barrier. Finally a current event is set by the last thread to arrive at the barrier to release threads that are blocking while waiting for the last thread to arrive, if indicated to do so by the examination of the indication. Other advantages and features of the invention are described below.

BRIEF DESCRIPTION OF THE DRAWINGS

A blocking local sense barrier is further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
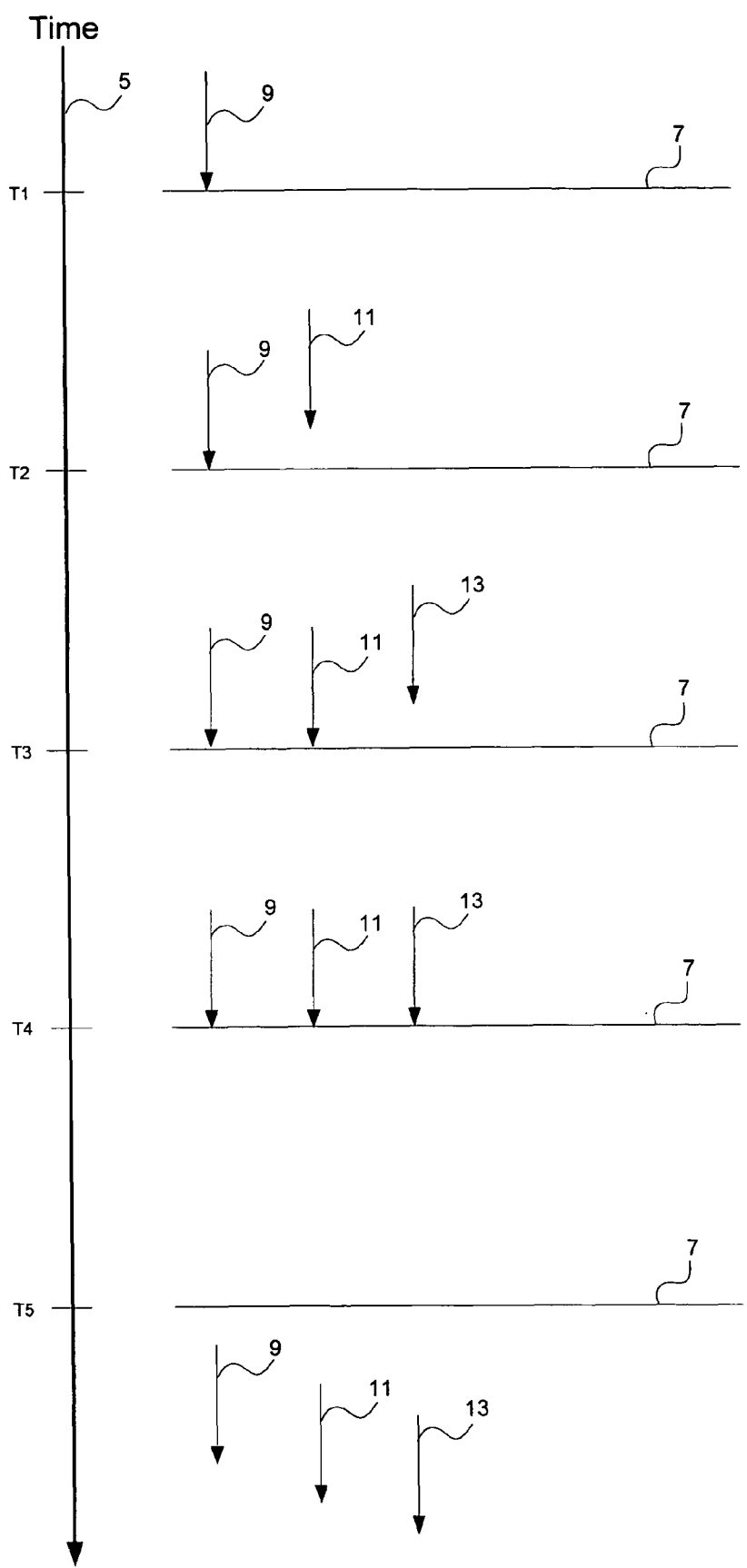
FIG. 1 is a chart illustrating threads arriving at and leaving a synchronization barrier at various points in time.

Referring to FIG. 1, shown is a chart illustrating the concept of threads arriving at and leaving a synchronization barrier at various points in time. Shown is a timeline 5, the synchronization barrier (barrier) 7, and first thread 9, second thread 11 and third thread 13. The chart is only an example to demonstrate graphically what occurs at a barrier and thus items such as the number of threads and time intervals, for example, are not to scale and can vary widely.

At T1, the first thread 9 has arrived at the barrier 7 and is waiting or spinning at the barrier 7 until all the other threads have arrived. At T2, the second thread 11 is shown about to arrive while the first thread 9 is still waiting at the barrier 7. At T3, both the first thread 9 and the second thread 11 are shown waiting while the third thread 13 is about to arrive. At T4 all three threads 9, 11, 13 have arrived at the barrier 7. At this time, all three threads 9, 11, and 13 are released since all have arrived at the barrier 7. At T5 all three threads have just left the barrier 7.

Two principle assumptions have been made in driving the design of the following synchronization barrier examples. First, it is assumed that the size of the barrier structure itself (that is, the number of bytes) is not critical. Unlike locks, barriers are typically not embedded in other structures. Second, the use scenario to optimize for is (1) a single thread per processor and (2) all threads arrive at the barrier at roughly the same time. This assumption highlights what is believed to be the optimal usage pattern for a barrier. A caller with more than one thread per processor will take a context swap every time threads rendezvous at the barrier. If threads arrive at the barrier at about the same time, the synchronization overhead will be small. Conversely, if threads have dramatically differing amounts of work to do between rendezvous and thus have large intervals between their arrivals, the threads which arrive first will either spin for a long time (wasting work) or block (taking the context swap). The primitive should support suboptimal usage patterns, but should be optimized for the optimal usage pattern.

Figure 2:
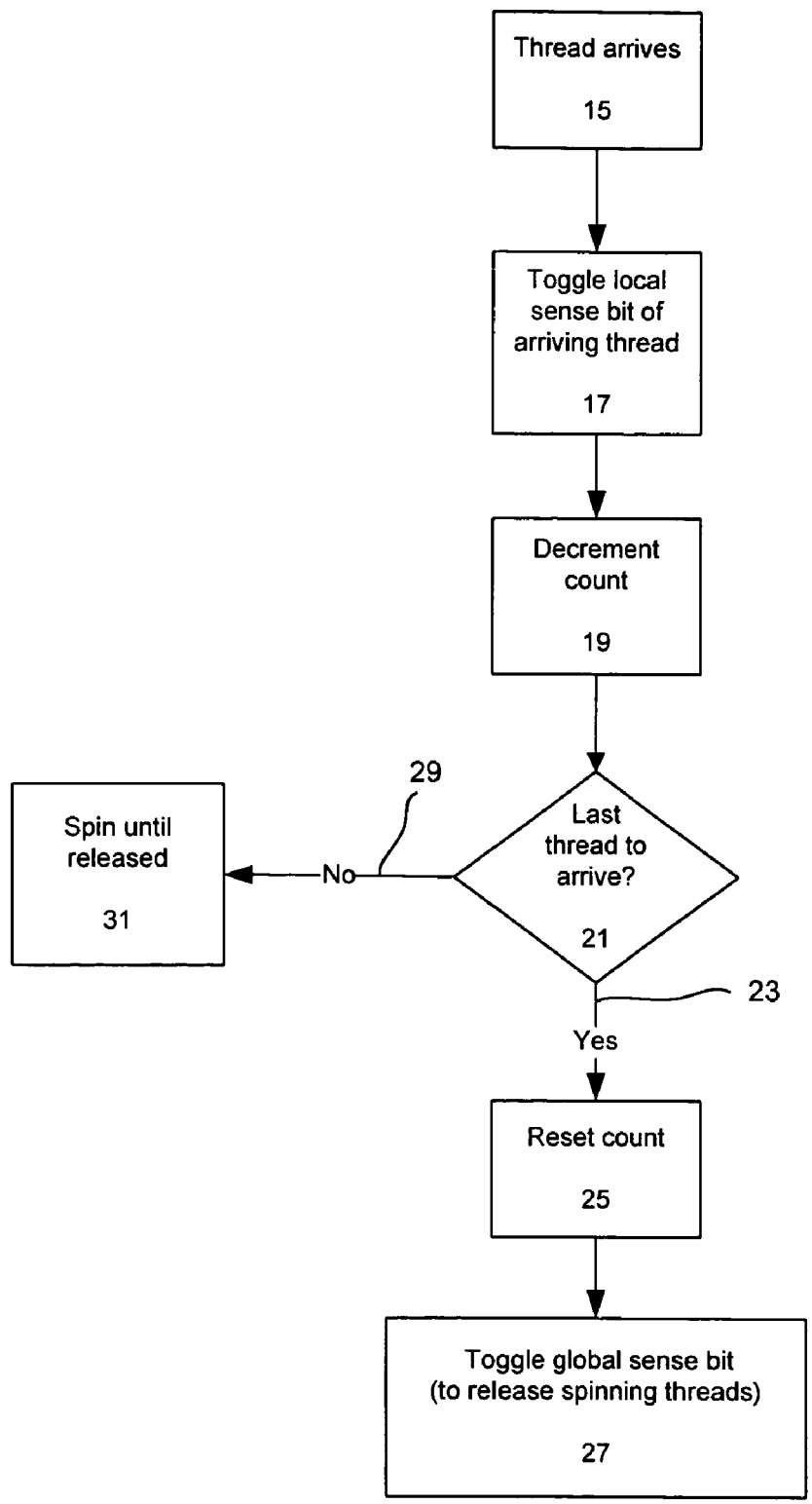
FIG. 2 is a flow chart illustrating a process according to a sense-reversing centralized barrier.

Referring to FIG. 2, shown is a flow chart illustrating a process according to a known sense-reversing centralized barrier provided for background. The process of FIG. 2 accompanies the following algorithm for a sense-reversing centralized barrier (which assumes a single thread per processor).

```
shared count : Integer := P
shared sense : Boolean := true
processor private local_sense : Boolean := true
procedure central.barrier
    local_sense : = not local-sense
    // each processor toggles its own sense
    If fetch_and_decrement (&count) = 1
        count := P
        sense := local_sense
        // last processor toggles global sense
    else
        repeat until sense = local_sense
```

The barrier shown above and in FIG. 2 uses a global count variable to store the number of threads which have yet to reach the barrier and a sense bit which is toggled once per rendezvous to signal that all threads have arrived and may continue on. Threads store their own local sense variable. Arriving threads 15 toggle their local sense bit 17 and then decrement the count 19. A determination is made to ascertain whether the current arriving thread is the last thread to arrive 21. If it is the last thread to arrive 23, it resets count and toggles the global sense bit 27 to release spinning threads. If a thread is not the last to arrive 29, it spins waiting to be released 31.

The process described above improves upon barriers described in earlier works which required two spins and two interlocked operations. This barrier requires only a single spin and a single interlocked decrement ("fetch_and_decrement").

From an API design standpoint, however, this barrier is problematic because it requires that each thread/processor maintain its own local_sense variable across calls. To design an API for this, for example, one might either store the local_sense in the PRCB (for kernel barriers) or TEB (for usermode barriers), or have the function return the localsense variable and require that the caller store that value until the next rendezvous. In either case this complicates the API. However further analysis shows that this is unnecessary. The barrier's sense bit only changes when the last thread arrives at the barrier and reverses the bit to release the spinning threads. This property allows making local_sense a local variable. An example of an implementation of this aspect in a synchronization barrier is shown in the code below.

```
#define SENSE_BIT 0x80000000
typedef struct _BARRIER {
    ULONG Barrier;
    ULONG TotalProcessors; // equivalent to P above
} BARRIER, *PBARRIER;
LOGICAL Barrier (PBARRIER Barrier)
{
    ULONG LocalSense, CapturedValue;
    CapturedValue = InterlockedDecrement(
            &Barrier->Barrier);
    LocalSense = ((~CapturedValue) & SENSE_BIT);
    if ((CapturedValue & (~SENSE_BIT)) == 0) {
        Barrier->Barrier =
            LocalSense | Barrier->TotalProcessors;
        return TRUE;
    }
    while ((Barrier->Barrier & SENSE_BIT) != LocalSense) {
    }
    return FALSE;
}
```

The example above unions the sense and count variables into Barrier, such that the high bit of Barrier is the sense and the lower 31 are the count. This is possible because a thread id is 24 bits, so there cannot be more than $2^{24}$ threads waiting on a barrier. However, the previous is specific to the Microsoft Windows® operating system and this may vary in different operating systems (OS's). The number of threads is generally smaller than the size of a pointer by at least 2× (so on a 64-bit machine, there can be at most 263 threads) because each thread must have some amount of storage space associated with it for the stack, register space, etc. Thus on other OS's and architectures there will be a free bit which can be used as the sense bit. This example above gives the performance advantage of the local sense barrier, without having to store the per-thread local sense bit across calls.

Also, note that a tiebreaker has been added for the return value. One thread's call will return TRUE, while the rest return FALSE. This is sometimes used by the caller to select one thread to perform some additional work which must be done exactly once.

Figure 3:
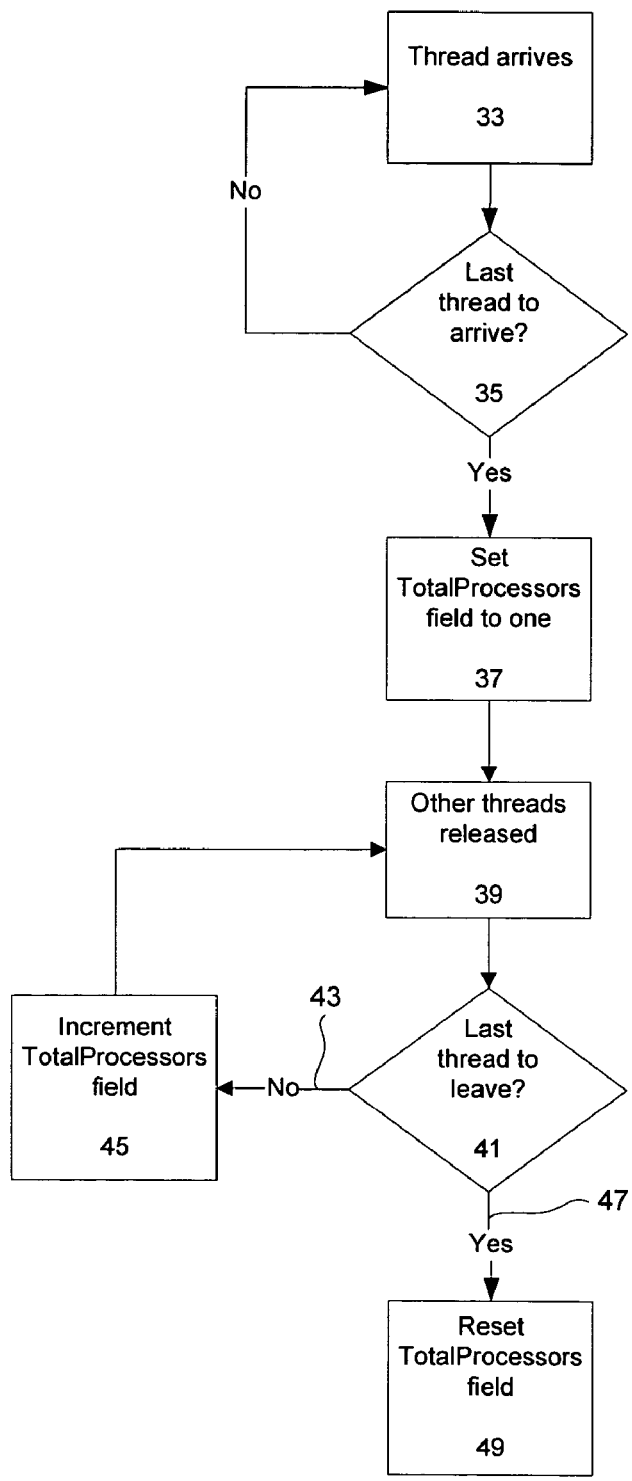
FIG. 3 is a flow chart illustrating a process according to a local sense synchronization barrier supporting safe deletion of a barrier.

Referring next to FIG. 3, shown is a flow chart illustrating a process according to a local sense synchronization barrier supporting safe deletion of a barrier. Supporting the deletion semantic is an area where value may be added for customers beyond just performance. One reason providing such support may become difficult is that one needs to know that all threads have left the barrier before it can be reclaimed. With the barrier examples above, this is impossible because a thread which has left the barrier cannot be distinguished from and a thread which was preempted while spinning on Barrier->Barrier. If the thread was suspended during its spin and the barrier was reclaimed before it got a chance to run, when it awoke and tried to examine the value of Barrier->Barrier, that memory might be freed or used for something else, thus accessing it is unsafe. In strict POSIX compliant and other known implementations, if delete is called while a thread is still in the barrier, the results are undefined. This forces developers to use some wrapper synchronization around the barrier in order to know when threads have left the barrier and it is safe to delete.

To support safe deletion of a barrier, the process makes sure that the last operation a thread performs on a barrier is a write. If the last operation is a read, as in the above code, there is no indication of when the thread has left the barrier. To make the last operation on a barrier a write, the process above is modified. A TotalProcessors field is used as a count of threads which have left the barrier. After a thread arrives 33 at the barrier, if it is the last thread to arrive 35, it sets the TotalProcessors field to be one 37 before releasing the other threads 39. A determination is then made whether the thread is the last one to leave 41. If the thread is not the last one to leave 43, it increments 45 the TotalProcessors field just before returning. If the thread is the last one to leave, 47, the TotalProcessors field is reset 49. As other threads are released 39, it is determined whether each is the last thread to leave 41 and the TotalProcessors field incremented 45 accordingly as above.

TotalProcessors thus performs a dual role, both storing the total number of threads joined to the barrier and counting the number of threads which have left the barrier after a rendezvous. TotalProcessors can be used for both because the number of threads is only needed when the last thread resets the count. Since it is the last thread to reach the barrier, all other threads must have left the previous rendezvous (because they have arrived at the current rendezvous), and so they each must have incremented the count. When the last thread arrives, TotalProcessors has been incremented once by each thread and thus stores the total number of threads on the barrier.

Note that the ordering is important for the last thread arriving: once the sense bit is toggled, the other threads are able to leave 39 the barrier and the toggling thread may be swapped out, so it is necessary to make sure that Barrier->TotalProcessors is appropriately set before releasing the other threads. The DeleteBarrier call is now safe to implement, because once TotalProcessors gets incremented back to P, this indicates all threads have left the barrier and so it can be reclaimed.

Figure 4:
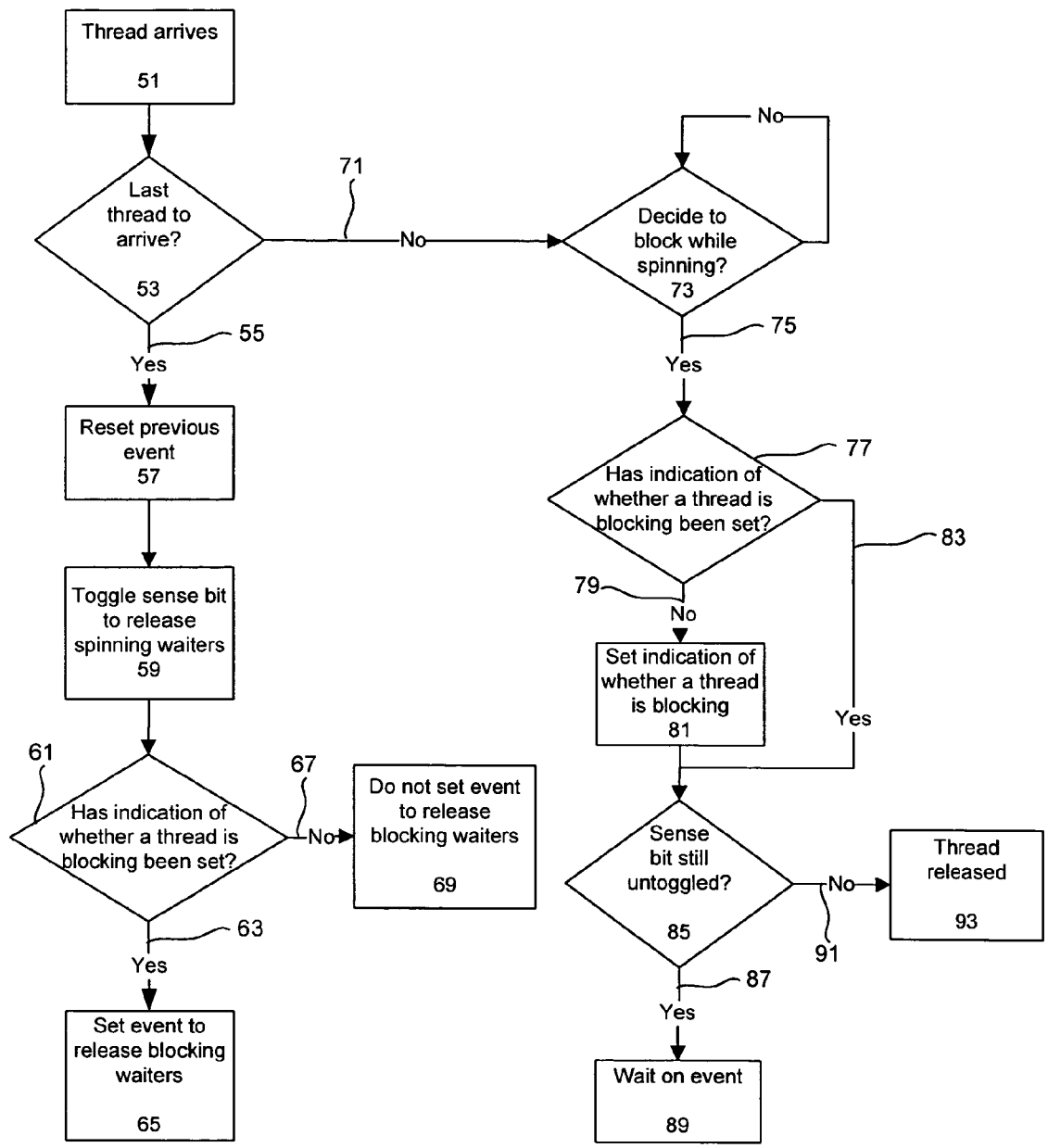
FIG. 4 is a flow chart illustrating a process according to a blocking synchronization barrier.

Referring next to FIG. 4, shown is a flow chart illustrating a process according to a blocking synchronization barrier. The flow chart illustrates a process which is an extension of the local sense barrier described above. Notification events, are added to the barrier structure described above. "Notification events" is a Microsoft Windows® operating system specific term, but primitives like this are available on other platforms and thus are available for use in implementation of the synchronization barrier as discussed herein as well.

One problem with adding blocking is that it adds two kernel calls to every rendezvous. This is particularly bothersome in the case where the caller has used barriers correctly according to the previous assumptions. All threads are spinning and none are blocking, yet the caller must pay the cost of blocking support they do not use. This cost is removed in the spin-only case by using an indication to determine whether a thread is blocking.

After a thread arrives 51, it is determined whether it is the last thread to arrive 53. If it is the last thread to arrive 55, it resets the previous event 57, sets the TotalProcessors and Barrier variables in the barrier structure to release spinning waiters 59. It is then determined whether the indication of whether a thread is blocking has been set 61 (by previous threads as is described below). If so, then the current event is set to release all blocking waiters 65. If not, then the current event is not set to release all blocking waiters 69.

If the thread is not the last to arrive 71, threads spin for some interval waiting for the last thread to arrive 73, and when they decide to block 75, they examine the indication of whether a thread is blocking has been set 77. If the indication of whether a thread is blocking has not been set 79, they set the indication 81 to indicate that the last thread to arrive must set the event 65. Otherwise, the indication is not set 83. The blocking thread then looks back at the sense bit 85 and, if it is still un-toggled 87, waits on the event 89. If the sense bit has been toggled 91, the thread is released 93. As described above, the last thread to arrive 55 toggles the sense bit 59 then checks the indication of whether a thread is blocking has been set 61, setting the event 65 if the indication has been set 65. With this process, the kernel is made to set/reset event calls only if threads are blocking, and do not slow down the spin case.

Figure 5:
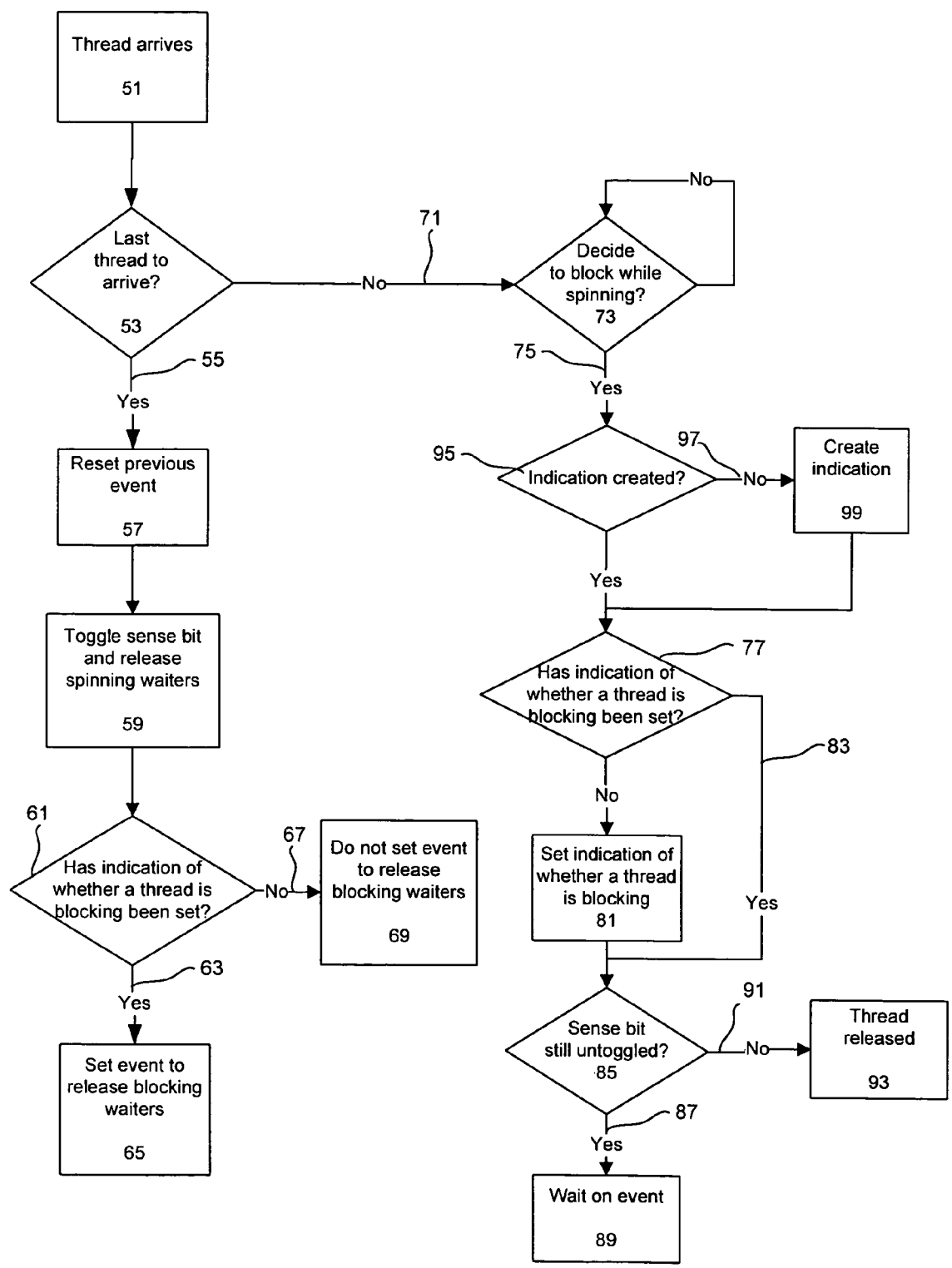
FIG. 5 is a flow chart illustrating a process according to the blocking synchronization barrier of FIG. 4 with a further optimization.

Referring next to FIG. 5, shown is a flow chart illustrating a process according to the blocking synchronization barrier of FIG. 4 with a further optimization. As a final optimization to keep the blocking case from bloating the spin case, the indication of whether a thread is blocking is not created until a thread needs to block. If a thread needs to block 75, a check is made to determine whether the indication of whether a thread is blocking has been created 95. If not 97, such an indication is created 99. Thus, callers who never block do not have to spend the resources to create these unnecessary indications.

Figure 6:
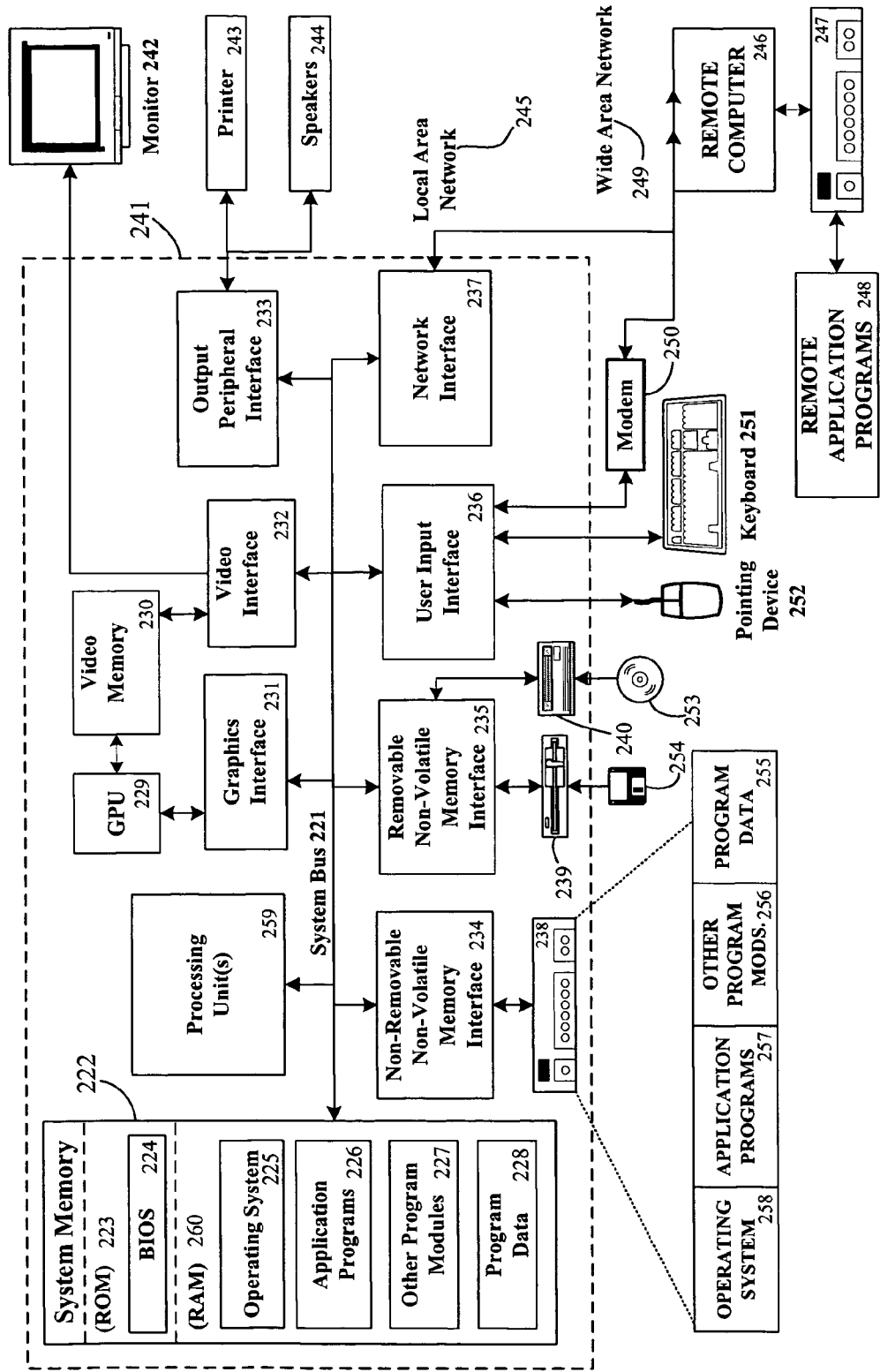
FIG. 6 is a block diagram representing an exemplary computing device suitable for use in conjunction with implementing the synchronization barrier processes of FIGS. 1 through 5.

Referring next to FIG. 6, shown is a block diagram representing an exemplary computing device suitable for use in conjunction with implementing the processes described above and of FIGS. 1 through 5 synchronization barriers. For example, the computer executable instructions that carry out the processes and methods for synchronization barriers may reside and/or be executed in such a computing environment as shown in FIG. 6. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 6 illustrates operating system 225, application programs 226, other program modules 227, and program data 228.

The computer 241 may also include other removable/non-removable, volatile/nonvolatile computer storage media. By way of example only, FIG. 6 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 6, provide storage of computer readable instructions, data structures, program modules and other data for the computer 241. In FIG. 6, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 6. The logical connections depicted in FIG. 6 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 6 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program (s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 7:
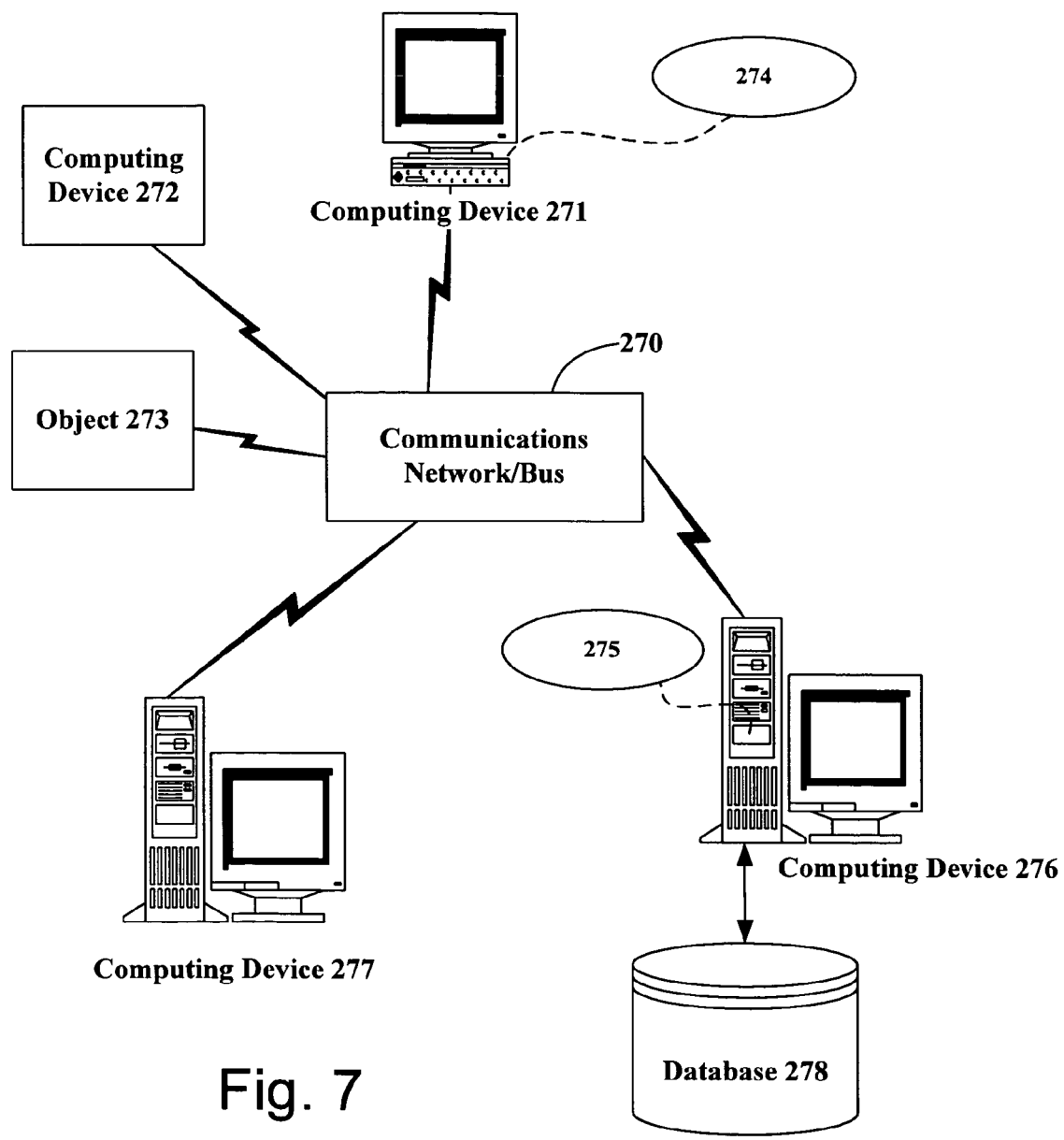
FIG. 7 illustrates an exemplary networked computing environment in which many computerized processes may be implemented to perform the synchronization barrier processes of FIGS. 1 through 5.

Referring next to FIG. 7, shown is an exemplary networked computing environment in which many computerized processes may be implemented to perform the processes described above and shown FIGS. 1 through 5 of synchronization barriers. For example, parallel computing may be part of such a networked environment with various clients on the network of FIG. 7 using synchronization barriers such as those in FIGS. 3 through 5. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 7 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 7, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 7, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 7 and the further diversification that can occur in computing in a network environment such as that of FIG. 7, the systems and methods provided herein cannot be construed as limited in any way to a particular computing architecture. Instead, the invention should not be limited to any single embodiment, but rather should be construed in breadth and scope in accordance with the appended claims.

What is claimed:

1. A method comprising:
    concurrently executing software threads on parallel processors;
    synchronizing the concurrently executing software threads via a synchronization barrier implemented via a synchronization barrier method having a property that no thread of the concurrently executing software threads can return from a call before all threads of the concurrently executing software threads have entered it; and
    providing a variable that is to be changed within the synchronization barrier method, and read to determine when software threads should be released, wherein said variable is a local sense variable that is strictly local to the synchronization barrier method and neither a global variable nor a processor private variable, and wherein said variable is known within a block of code associated with the synchronization barrier method, but inaccessible to code outside the block.

2. The method of claim 1 wherein the value of the variable is not stored outside of the synchronization barrier method.

3. The method of claim 1 wherein the value of the variable is not stored across calls to the synchronization barrier method.

4. A method comprising:
    concurrently executing software threads on parallel processors;
    synchronizing the concurrently executing software threads via a synchronization barrier implemented via a synchronization barrier method having a property that no thread of the concurrently executing software threads can return from a call before all threads of the concurrently executing software threads have entered it; and
    ensuring a last operation each thread performs before returning from the synchronization barrier method is a write operation on a count variable within said synchronization barrier method which indicates a number of threads that have left the synchronization barrier; and
    reclaiming the synchronization barrier when said count variable indicates that all threads have left the synchronization barrier, wherein the count variable is known within a block of code associated with the synchronization barrier method, but inaccessible to code outside the block.

5. The method of claim 4 wherein said count variable serves a dual role of storing a total number of threads that have arrived at the synchronization barrier and counting the number of threads which have left the synchronization barrier.

6. The method of claim 4 further comprising initializing the count variable by setting a field to be a predetermined value by a last thread to arrive at the barrier before releasing other threads from the barrier; and wherein a thread performs a write operation on said count variable by incrementing a count value in the field before that thread returns.

7. The method of claim 4 further comprising:
    using an indication of whether a thread is blocking to determine whether a thread is blocking;
    resetting a previous event by a last thread to arrive at the barrier;
    determining whether to reset a current event by the last thread to arrive at the barrier by examining the indication of whether a thread is blocking;
    releasing spinning threads waiting for the last thread to arrive at the barrier; and
    setting a current event by the last thread to arrive at the barrier to release threads that are blocking while waiting for the last thread to arrive if indicated to do so by the examination of the indication of whether a thread is blocking.

8. The method of claim 7 wherein the act of using an indication of whether a thread is blocking to determine whether a thread is blocking comprises:
    examining the indication of whether a thread is blocking by a thread deciding to block;
    setting the indication of whether a thread is blocking by a thread deciding to block, if the indication of whether a thread is blocking is not set, in order to indicate that the last thread to arrive at the barrier must set the event;
    examining a variable by the thread deciding to block that indicates whether the last thread has arrived at the barrier;
    waiting by blocking until the event is set, if the variable examined indicated that the last thread has not arrived at the barrier.

9. A method comprising:
    concurrently executing software threads on parallel processors;
    synchronizing the concurrently executing software threads via a synchronization barrier implemented via a synchronization barrier method having a property that no thread of the concurrently executing software threads can return from a call before all threads of the concurrently executing software threads have entered it;
    providing a variable that is to be changed within the synchronization barrier method, and examined to determine when software threads should be released, wherein said variable is a local sense variable that is strictly local to the synchronization barrier method and neither a global variable nor a processor private variable;
    providing an indication of whether a thread is blocking, which is used to determine whether a thread is blocking, wherein the indication of whether a thread is blocking is created only at a time when a thread decides to block;
    when a last thread arrives at the synchronization barrier, resetting a previous event;
    releasing spinning threads waiting for the last thread to arrive at the synchronization barrier by changing the local sense variable;
    examining the indication of whether a thread is blocking to determine whether a thread is blocking; and
    setting a current event to release threads that are blocking while waiting for the last thread to arrive, if indicated to do so by the examination of the indication of whether a thread is blocking.

10. A computer readable storage medium having computer-executable instructions stored thereon, wherein the computer executable instructions are executable by a computer to perform the steps of:

concurrently executing software threads on parallel processors;

synchronizing the concurrently executing software threads via a synchronization barrier implemented via a synchronization barrier method having a property that no thread of the concurrently executing software threads can return from a call before all threads of the concurrently executing software threads have entered it; and providing a variable that is to be changed within the synchronization barrier method, and read to determine when software threads should be released, wherein said variable is a local sense variable that is strictly local to the synchronization barrier method and neither a global variable nor a processor private variable, and wherein said variable is known within a block of code associated with the synchronization barrier method, but inaccessible to code outside the block.

11. The computer readable storage medium of claim 10 wherein the value of the variable is not stored outside of the synchronization barrier method.

12. The computer readable storage medium of claim 10 wherein the value of the variable is not stored across calls to the synchronization barrier method.

13. A computer readable storage medium having computer-executable instructions stored thereon, wherein the computer executable instructions are executable by a computer for performing the steps of:

concurrently executing software threads on parallel processors;

synchronizing the concurrently executing software threads via a synchronization barrier implemented via a synchronization barrier method having a property that no thread of the concurrently executing software threads can return from a call before all threads of the concurrently executing software threads have entered it;

ensuring a last operation each thread performs before returning from the synchronization barrier method is a write operation on a count variable within said synchronization barrier method which indicates a number of threads that have left the synchronization barrier; and reclaiming the synchronization barrier when said count variable indicates that all threads have left the synchronization barrier, wherein the count variable is known within a block of code associated with the synchronization barrier method, but inaccessible to code outside the block.

14. The computer readable storage medium of claim 13 wherein said count variable serves a dual role of storing a total number of threads that have arrived at the synchronization barrier and counting the number of threads which have left the synchronization barrier.

15. The computer readable storage medium of claim 13, further comprising initializing the count variable by setting a field to be a predetermined value by a last thread to arrive at the barrier before releasing other threads from the barrier; and wherein a thread performs a write operation on said count variable by incrementing a count value in the field before that thread returns.

16. The computer readable storage medium of claim 13 having computer-executable instructions stored thereon, wherein the computer executable instructions are executable by a computer to further perform the steps of:

using an indication of whether a thread is blocking to determine whether a thread is blocking;

resetting a previous event by a last thread to arrive at the barrier;

determining whether to reset a current event by the last thread to arrive at the barrier by examining the indication of whether a thread is blocking;

releasing spinning threads waiting for the last thread to arrive at the barrier; and setting a current event by the last thread to arrive at the barrier to release threads that are blocking while waiting for the last thread to arrive if indicated to do so by the examination of the indication of whether a thread is blocking.

17. The computer readable storage medium of claim 16 wherein the act of using an indication of whether a thread is blocking to determine whether a thread is blocking comprises:

examining the indication of whether a thread is blocking by a thread deciding to block;

setting the indication of whether a thread is blocking by a thread deciding to block, if the indication of whether a thread is blocking is not set, in order to indicate that the last thread to arrive at the barrier must set the event;

examining a variable by the thread deciding to block that indicates whether the last thread has arrived at the barrier;

waiting by blocking until the event is set, if the variable examined indicated that the last thread has not arrived at the barrier.

18. A computer readable storage medium having computer-executable instructions stored thereon, wherein the computer executable instructions are executable by a computer to perform method the steps of:

concurrently executing software threads on parallel processors;

synchronizing the concurrently executing software threads via a synchronization barrier implemented via a synchronization barrier method having a property that no thread of the concurrently executing software threads can return from a call before all threads of the concurrently executing software threads have entered it;

providing a variable that is to be changed within the synchronization barrier method, and examined to determine when software threads should be released, wherein said variable is a local sense variable that is strictly local to the synchronization barrier method and neither a global variable nor a processor private variable;

providing an indication of whether a thread is blocking, which is used to determine whether a thread is blocking, wherein the indication of whether a thread is blocking is created only at a time when a thread decides to block;

when a last thread arrives at the synchronization barrier, resetting a previous event releasing spinning threads waiting for the last thread to arrive at the synchronization barrier by changing the local sense variable;

examining the indication of whether a thread is blocking to determine whether a thread is blocking; and setting a current event to release threads that are blocking while waiting for the last thread to arrive, if indicated to do so by the examination of the indication of whether a thread is blocking.

* * * * *